(12) United States Patent
Rezk et al.

(10) Patent No.: US 9,304,189 B2
(45) Date of Patent: Apr. 5, 2016

(54) SYSTEMS AND METHODS FOR DETECTING RADAR SIGNALS

(71) Applicant: QUALCOMM Incorporated, San Diego, CA (US)

(72) Inventors: Meriam Khufu Ragheb Rezk, Campbell, CA (US); Richard Mosko, Santa Clara, CA (US); Tevfik Yucek, Santa Clara, CA (US); Adrian Harold Chadd, San Jose, CA (US)

(73) Assignee: Qualcomm, Incorporated, San Diego, CA (US)

( * ) Notice: Subject to any disclaimer, the term of this patent is extended or adjusted under 35 U.S.C. 154(b) by 114 days.

(21) Appl. No.: 14/089,236

(22) Filed: Nov. 25, 2013

(65) Prior Publication Data

US 2014/0253361 A1    Sep. 11, 2014

Related U.S. Application Data

(60) Provisional application No. 61/815,675, filed on Apr. 24, 2013, provisional application No. 61/775,421, filed on Mar. 8, 2013.

(51) Int. Cl.
*G01S 7/02* (2006.01)
*H04B 1/10* (2006.01)
*H04K 3/00* (2006.01)

(52) U.S. Cl.
CPC .............. *G01S 7/021* (2013.01); *H04B 1/1027* (2013.01); *H04K 3/226* (2013.01); *H04K 3/822* (2013.01); *H04K 2203/18* (2013.01)

(58) Field of Classification Search
CPC .. G01S 7/021; H04B 1/1027; H04K 2203/18; H04K 3/226; H04K 3/822
USPC ........................................................... 342/16
See application file for complete search history.

(56) References Cited

U.S. PATENT DOCUMENTS

| | | | |
|---|---|---|---|
| 6,697,013 B2 | 2/2004 | McFarland et al. | |
| 7,107,032 B2 | 9/2006 | Li | |
| 7,907,080 B1 | 3/2011 | Zhang et al. | |
| 7,929,508 B1 | 4/2011 | Yucek et al. | |
| 8,032,087 B2 | 10/2011 | Muquet | |
| 2004/0023674 A1 | 2/2004 | Miller | |
| 2006/0171445 A1 | 8/2006 | Batra et al. | |
| 2009/0096661 A1* | 4/2009 | Sakamoto | 342/92 |
| 2013/0113645 A1 | 5/2013 | Nallapureddy et al. | |
| 2013/0128927 A1 | 5/2013 | Yucek et al. | |
| 2013/0170586 A1 | 7/2013 | Yucek et al. | |
| 2013/0295925 A1* | 11/2013 | Jacob | H04J 11/0069 455/434 |
| 2013/0314267 A1 | 11/2013 | Kenney et al. | |
| 2014/0022113 A1 | 1/2014 | Nogueira-Nine | |

OTHER PUBLICATIONS

Kruys J., et al., "Sharing with Primary Spectrum Users," Sharing RF Spectrum with Commodity Wireless Technologies Signals and Communication Technology, Chapter 9, 2011, pp. 163-197.
International Search Report and Written Opinion—PCT/US2014/021988—ISA/EPO—Jun. 30, 2014.

* cited by examiner

*Primary Examiner* — Timothy A Brainard
(74) *Attorney, Agent, or Firm* — Bay Area Technology Law Group PC

(57) ABSTRACT

This disclosure includes systems and methods for detecting radar signals by performing an initial spectral analysis to identify candidate radar signals and subsequently determining whether any candidate radar signals are false detections using a secondary analysis.

27 Claims, 6 Drawing Sheets

SYSTEMS AND METHODS FOR DETECTING RADAR SIGNALS

RELATED APPLICATIONS

This application claims the benefit of and priority to U.S. Provisional Patent Application No. 61/775,421, filed Mar. 8, 2013, entitled "Systems And Methods For Detecting Radar Signals" and U.S. Provisional Patent Application No. 61/815,675, filed Apr. 24, 2013, entitled "Systems And Methods For Detecting Radar Signals," both of which are assigned to the assignee hereof and are incorporated herein by reference in their entirety.

FIELD OF THE PRESENT DISCLOSURE

This disclosure generally relates to wireless communication systems and more specifically to systems and methods facilitating discovery between peers in an ad hoc network.

BACKGROUND

As techniques for transmitting information wirelessly proliferate and develop, the potential for conflicts may arise, particularly with regard to the use of similar portions of the radio frequency spectrum by disparate systems. For example, Wireless Local Area Network (WLAN) devices, such as those conforming to Institute for Electrical and Electronic Engineers (IEEE) 802.11 protocols, using the 5 GHz frequency band may interfere with radar systems using similar frequencies. To minimize conflicts, a wireless communications device may be configured to avoid operating on frequencies in which radar signals have been detected. For example, a number of regulatory domains, including in the United States (governed by the Federal Communications Commission, FCC), in Europe (governed by the European Telecommunications Standards Institute, ETSI) and in Japan have established requirements that in order to use certain 5 GHz frequencies, the WLAN systems must be capable of Dynamic Frequency Selection (DFS.) Generally, a DFS capable master device monitors the spectrum and selects a frequency for operation that is not already in use by a radar system. Further, the master device, such as an access point (AP) in WLAN systems, may be required to continually monitor the radio environment for radar presence. When radar use within the frequency band is detected, the AP may be required to cease all transmissions within a designated time period and dynamically recommence operation on another channel.

Radar pulses are usually narrowband and have a fixed frequency and many radar signals in the 5 GHz spectrum typically include periodic bursts of radar pulses. The bursts typically have a period of about 1 ms and the pulse duration is typically between 1-5 µs, although longer pulse durations of 50-100 µs are also possible. Other radar signals, such as those employed by weather stations or the military may also exhibit a sweep signal, also known as a chirp pulse, where the frequency of the signal varies over time within a fixed bandwidth. As such, detection of signals having these characteristics is also desirable.

One technique for detecting the presence of radar operation may involve spectrally analyzing the signal received by a wireless communications device to identify a narrowband pattern that is distinguishable from a wideband pattern associated with a WLAN transmission. When a signal having a strength exceeding a threshold is detected that does not span too great a frequency range, it may be classified as a radar detection and triggers the channel switching requirements of the DFS system. In some situations, however, this technique may result in a false positive detection due to characteristics of other signals that may appear to match the narrowband characteristics of a radar signal. For example, false detection may result from in band traffic, particularly in a frequency selective channel conditions, from adjacent band traffic, from alternate far blockers aliasing in band, or in other situations.

The ramifications of a positive radar detection may be significant. As noted above, DFS requirements may specify that a wireless communications device vacate a channel on which radar has been detected for a significant period of time, such as up to 30 minutes in some regulatory domains. In turn, this may result in an interruption in WLAN operation and reduced throughput. These problems may be exacerbated in applications involving higher bandwidth modes of operation, such as those using 80 MHz channels, as relatively few channels are available in the 5 GHz spectrum. Accordingly, it would be desirable to provide systems and methods for detecting radar signals that identify false detections so that WLAN operation is not needlessly compromised. This disclosure satisfies this and other goals.

SUMMARY

This disclosure involves systems for wireless communication, and may include a wireless communications device configured to detect radar signals, using a receiver having a Fast Fourier Transform (FFT) unit for receiving an incoming signal, wherein the FFT unit generates a first FFT capture including a signal magnitude for a plurality of frequency bins and a radar unit configured to perform an initial signal analysis on the first FFT capture, identify a candidate radar signal based at least in part on whether the signal magnitude of at least one of the frequency bins exceeds an initial threshold, perform a secondary signal analysis on the incoming signal, and determining the candidate radar signal is a false detection based at least in part on the secondary signal analysis.

In one aspect, the FFT unit may also generate a second FFT capture of the incoming signal including a signal magnitude for a plurality of frequency bins, wherein the first FFT capture is performed at a first resolution, the second FFT capture is performed at a second resolution and the second resolution is higher than the first resolution and the radar unit may perform the secondary signal analysis using the second FFT capture. Further, the radar unit may determine the candidate radar signal is a false detection based at least in part on the signal magnitude of at least one of the frequency bins of the second FFT capture exceeding a secondary threshold. Alternatively or in conjunction, the FFT unit may also generate at least one subsequent FFT capture of the incoming signal such that the radar unit may perform the secondary signal analysis using the subsequent FFT capture to supersede the secondary signal analysis using the second FFT capture.

In one aspect, the radar unit may perform the secondary signal analysis by determining a location of a frequency bin having a maximal signal magnitude in relation to a wireless channel at which the receiver is operating and the radar unit may determine the candidate radar signal is a false detection based at least in part on the frequency bin having the maximal signal magnitude being located at a band edge of the wireless channel.

In one aspect, the FFT unit may generate the first FFT capture over an increased bandwidth and the radar unit may perform the secondary signal analysis by determining a location of a frequency bin having a maximal signal magnitude in relation to a boundary of a wireless channel at which the receiver is operating. Further, the radar unit may determine the candidate radar signal is a false detection based at least in part on the frequency bin having the maximal signal magnitude being located outside the wireless channel. Also further, the radar unit may determine the candidate radar signal is a false detection based at least in part on a frequency bin within the wireless channel having a maximal signal magnitude not exceeding a secondary threshold.

In one aspect, the radar unit may also detect a radio frequency (RF) saturation event, such that the radar unit may perform the secondary signal analysis by determining a maximal signal magnitude of a frequency bin and the radar unit may determine the candidate radar signal is a false detection based at least in part on the maximal signal magnitude of the frequency bin does not exceed a saturation threshold, wherein the saturation threshold is greater than the initial threshold.

This disclosure also includes methods for detecting radar signals in wireless communication. For example, a suitable method may involve receiving an incoming wireless signal, generating a first FFT capture including a signal magnitude for a plurality of frequency bins of the incoming wireless signal, performing an initial signal analysis on the first FFT capture, identifying a candidate radar signal based at least in part on whether the signal magnitude of at least one of the frequency bins exceeds an initial threshold, performing a secondary signal analysis on the incoming wireless signal, and determining the candidate radar signal is a false detection based at least in part on the secondary signal analysis.

In one aspect, the method may include generating a second FFT capture of the incoming signal, wherein the first FFT capture is performed at a first resolution, the second FFT capture is performed at a second resolution and the second resolution is higher than the first resolution and such that performing secondary signal analysis comprises using the second FFT capture. Determining the candidate radar signal is a false detection may be based at least in part on the signal magnitude of at least one of the frequency bins of the second FFT capture exceeding a secondary threshold. Alternatively or in conjunction, the method may include generating at least one subsequent FFT capture of the incoming signal and performing secondary signal analysis may include superseding the second FFT capture with the subsequent FFT capture.

In one aspect, performing secondary signal analysis may include determining a location of a frequency bin having a maximal signal magnitude in relation to a wireless channel at which the receiver is operating and determining the candidate radar signal is a false detection may be based at least in part on the frequency bin having the maximal signal magnitude being located at a band edge of the wireless channel.

In one aspect, generating the first FFT capture may include generating an FFT capture over an increased bandwidth and performing secondary signal analysis may include determining a location of a frequency bin having a maximal signal magnitude in relation to a boundary of a wireless channel at which the receiver is operating. Further, determining the candidate radar signal is a false detection may be based at least in part on the frequency bin having the maximal signal magnitude being located outside the wireless channel. Also further, determining the candidate radar signal is a false detection may be based at least in part on a frequency bin within the wireless channel having a maximal signal magnitude not exceeding a secondary threshold.

In one aspect, the method may also involve detecting an RF saturation event, such that performing secondary signal analysis may include determining a maximal signal magnitude of a frequency bin and determining the candidate radar signal is a false detection may be based at least in part on the maximal signal magnitude of the frequency bin not exceeding a saturation threshold, wherein the saturation threshold is greater than the initial threshold.

This disclosure also includes a non-transitory processor-readable storage medium for detecting radar signals with a wireless communications device. The processor-readable storage medium has instructions that may be executed by a processor to cause the wireless communications device to receive an incoming wireless signal, generate a first FFT capture including a signal magnitude for a plurality of frequency bins of the incoming wireless signal, perform an initial signal analysis on the first FFT capture, identify a candidate radar signal based at least in part on whether the signal magnitude of at least one of the frequency bins exceeds an initial threshold, perform a secondary signal analysis on the incoming wireless signal, and determine the candidate radar signal is a false detection based at least in part on the secondary signal analysis.

In one aspect, the storage medium may also have instructions causing the wireless communications device to generate a second FFT capture of the incoming signal including a signal magnitude for a plurality of frequency bins, wherein the first FFT capture is performed at a first resolution, the second FFT capture is performed at a second resolution and the second resolution is higher than the first resolution and such that the instructions to cause the wireless communications device to perform secondary signal analysis include instructions to use the second FFT capture. Further, the instructions to cause the wireless communications device to determine the candidate radar signal is a false detection may include instructions to determine the signal magnitude of at least one of the frequency bins of the second FFT capture exceeds a secondary threshold. Alternatively or in conjunction, the storage medium may also include instructions causing the wireless communications device to generate at least one subsequent FFT capture of the incoming signal and the instructions to cause the wireless communications device to perform secondary signal analysis may include instructions to supersede the second FFT capture with the subsequent FFT capture.

In one aspect, the instructions to cause the wireless communications device to perform secondary signal analysis may include instructions to determine a location of a frequency bin having a maximal signal magnitude in relation to a wireless channel at which the receiver is operating and the instructions to cause the wireless communications device to determine the candidate radar signal is a false detection may include instructions to determine the frequency bin having the maximal signal magnitude is located at a band edge of the wireless channel.

In one aspect, the instructions to cause the wireless communications device to generate the first FFT capture may include instructions to generate an FFT capture over an increased bandwidth and the instructions to cause the wireless communications device to perform secondary signal analysis may include instructions to determine a location of a frequency bin having a maximal signal magnitude in relation to a boundary of a wireless channel at which the receiver is operating. Further, the instructions to cause the wireless communications device to determine the candidate radar signal is a false detection may include instructions to determine the frequency bin having the maximal signal magnitude is located outside the wireless channel. Also further, the instructions to cause the wireless communications device to determine the candidate radar signal is a false detection may include instructions to determine a frequency bin within the wireless channel having a maximal signal magnitude does not exceed a secondary threshold.

In one aspect, the storage medium may also include instructions causing the wireless communications device to detect an RF saturation event, such that the instructions to cause the wireless communications device to perform secondary signal analysis may include instructions to determine a maximal signal magnitude of a frequency bin and the instructions to cause the wireless communications device to determine the candidate radar signal is a false detection may include instructions to determine the maximal signal magnitude of the frequency bin does not exceed a saturation threshold, wherein the saturation threshold is greater than the initial threshold.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

Figure 1:
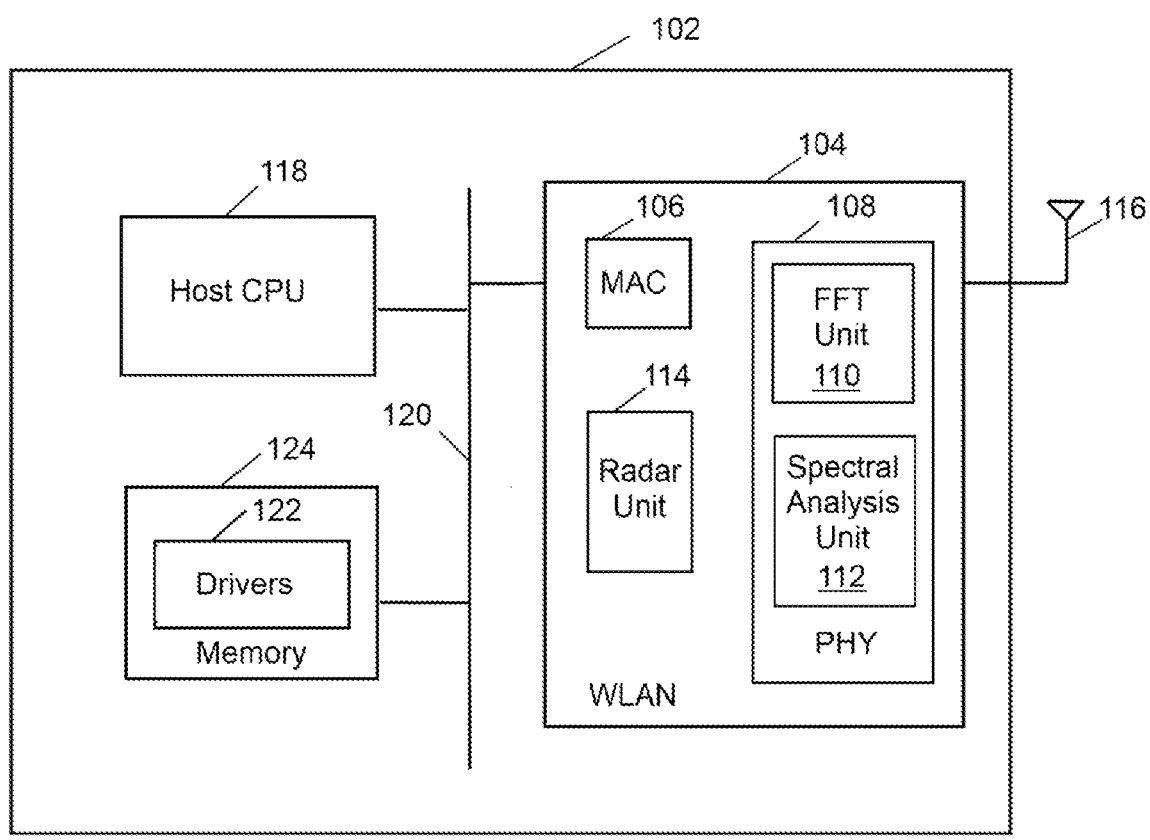
FIG. 1 schematically depicts a wireless communications device configured to identify false detections of radar signals, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Aspects of the present disclosure may be implemented within the hardware circuitry and/or software processes of a wireless communications device operating in the 5 GHz spectrum. The wireless network device is configured to receive network traffic from other WLAN devices. However, it may also receive unwanted signals from other sources, such as a radar source, requiring the wireless communications device to take measures to avoid transmitting on the same frequency bands as the interfering radar sources. To avoid degradation in WLAN performance associated with incorrectly identifying a signal as radar operation on the current wireless channel, the techniques of this disclosure may include performing an initial spectral analysis to identify candidate radar signals and subsequently validating any candidate radar signals using a secondary analysis.

Details regarding one embodiment of a wireless communications device 102 configured to identify false radar detections are depicted as high level schematic blocks in FIG. 1. Generally, wireless communications device 102 may employ an architecture in which the lower levels of the WLAN protocol stack are implemented in firmware and hardware modules of WLAN transceiver 104. WLAN transceiver 104 may include media access controller (MAC) 106 that performs functions related to the handling and processing of 802.11 frames of data including verification, acknowledgment, routing, formatting and the like. Incoming and outgoing frames are exchanged between the MAC 106 and a physical (PHY) layer 108 that modulates the frames according to the relevant 802.11 protocol and provides the analog processing and RF conversion necessary to provide transmission and reception of wireless signals.

As indicated, PHY layer 108 may include Fast Fourier Transform (FFT) unit 110 that may perform computations on received signals. Analysis of an incoming signal by FFT unit 110 may provide phase and magnitude information within defined frequency ranges, called "bins." When the received signal is a valid WLAN transmission, FFT unit 110 may demodulate the data signal to recover the payload. Similarly, other received signals, including radar signals, may also be processed by FFT unit 110. In one aspect, FFT unit 110 may measure the magnitude or strength of the received signal at each bin. For example, power may be measured by adding the absolute values or the squares of the in-phase (I) and quadrature (Q) components in the digital baseband signal. Signal power may indicate the presence of modulated data signals as well as radar signals and may be provided in the form of a received signal strength indication (RSSI). The output of FFT unit 110, also termed a "FFT capture," may represent a spectrogram of the received signal and may be fed to spectral analysis unit 112 for further characterization, which may include comparing signal magnitude in one or more bins to desired thresholds as well as relating the frequency exhibiting maximum signal magnitude to time and other operations. For example, the rate of change in the frequency exhibiting maximum signal magnitude may be checked against known characteristics of chirping radar pulses. Information from one or both of FFT unit 110 and spectral analysis unit 112 may be fed to radar unit 114 to detect and validate radar signals, according to the techniques of this disclosure. Radar unit 114 may also interface with MAC 106 to help implement DFS requirements and provide other suitable functionality. As desired, radar unit 114 may be implemented either as a software program or module executed by a processor within the wireless communications device 102, or it may be implemented as a dedicated hardware circuit coupled to MAC 106, or as a combination of software and hardware.

In the depicted embodiment, WLAN transceiver 104 has an associated antenna 116. As desired, one or more antennas may be employed, such as in multiple input, multiple output (MIMO) system. Wireless communications device 102 may also include host CPU 118 configured to perform the various computations and operations involved with the functioning of wireless communications device 102. As shown, host CPU 118 is coupled to WLAN transceiver 104 through bus 120, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN and supplementary systems are generally implemented as software instructions, such as drivers 122 stored in memory 124, that may be accessed by host CPU 118 over bus 120. In some embodiments, some or all portions of radar unit 114 may be implemented as software instructions stored in memory 124.

Figure 2:
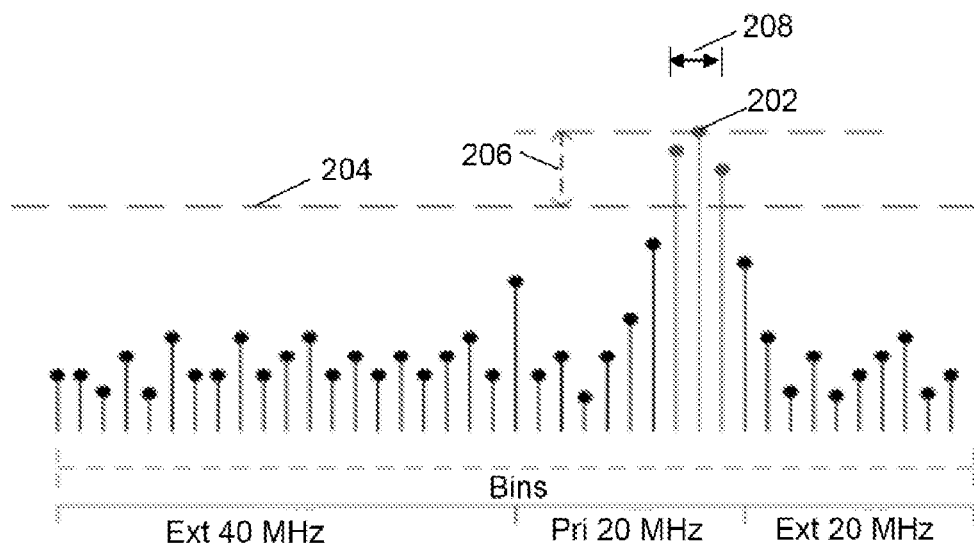
FIG. 2 depicts an FFT capture of an in band signal that may be detected as a radar signal, according to one embodiment.

As noted above, wireless communications device 102 may be configured to perform an initial signal analysis to identify candidate radar signals. One example of identification of a candidate radar signal is represented by the FFT capture depicted in FIG. 2. As shown, signal power is plotted across a plurality of frequency bins corresponding to an in band wireless channel, here an 80 MHz channel including a 20 MHz primary channel, a 20 MHz extension channel and a 40 MHz extension channel. A bin 202 having a peak signal power may be identified and an initial threshold 204 established as a difference 206 relative to that peak. As desired, the threshold may be an absolute difference in signal strength, dB, or may be a relative difference represented by a suitable percentage. Next, the number of bins exceeding the threshold may be identified. In one aspect, radar signals may be expected to be narrowband, spanning up to approximately 2 MHz. Accordingly, a candidate radar signal may be identified when the number of bins exceeding the initial threshold is below a number of bins that may be established based at least in part on the width of each bin of the FFT capture, such as approximately four in this example. As shown, a cluster 208 of three bins exceeds the initial threshold 204, such that a candidate radar signal may be identified. The embodiments described below involve the secondary analysis that may be applied to candidate radar signals to validate radar signals and identify false detections.

Figure 3:
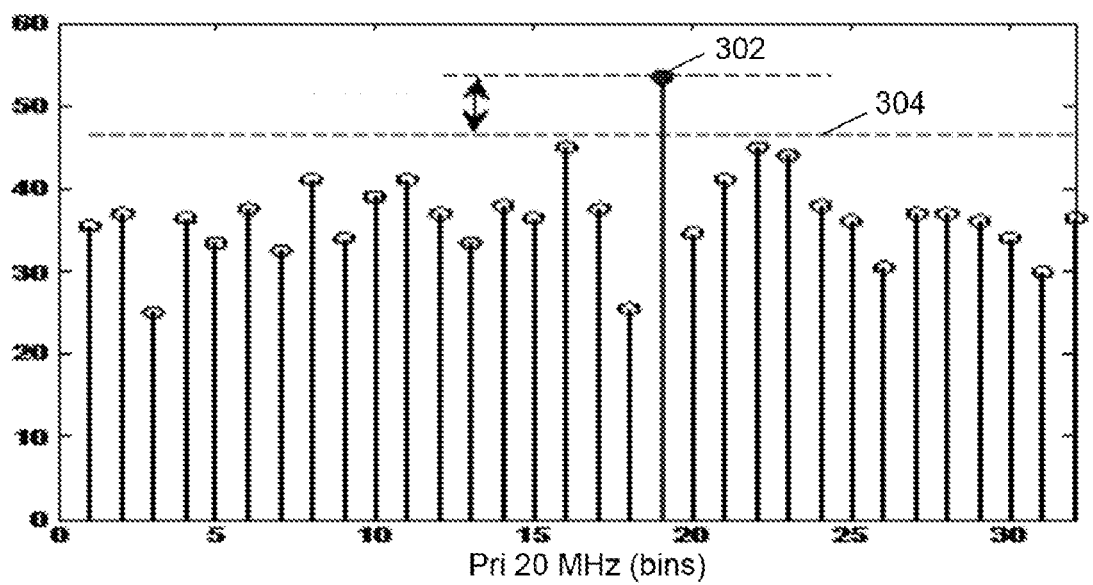
FIG. 3 depicts a low resolution FFT capture of an in band signal that may be detected as a radar signal, according to one embodiment.

In one embodiment, FFT unit 110 may be configured to output a first FFT capture at a first resolution used for the initial analysis and to output a second FFT capture at a second resolution, such that the second resolution is higher than the first resolution. The second FFT capture may be used in the secondary analysis to validate candidate radar signals. An example of an initial analysis using the first FFT capture is depicted in FIG. 3. Similar to the embodiment shown in FIG. 2, signal power is plotted across a plurality of frequency bins, in this case a 20 MHz primary channel. The first FFT capture may be performed relatively quickly to allow detection of transient radar signals. For example, the first FFT capture may include bins that span 0.8 µs each to provide a resolution of approximately 1.25 MHz, enabling detection of radar signals that may have duration of approximately 1 µs or less. As desired, other suitable sizing of FFT bins may be employed. Again, a bin 302 having a peak signal power may be identified and an initial threshold 304 established relative to the magnitude of the signal at that bin. In this embodiment, only a single bin exceeds the threshold, leading to identification of a candidate radar signal. However, as described above, channel conditions and other factors may result in the candidate radar signal being a false detection. Under wireless channel conditions, a wideband WLAN traffic signal may experience frequency selective fading, i.e. different frequency components fades differently, causing a wideband WLAN signal to have narrowband signal characteristics depending upon the thresholds used.

Since a WLAN transmission has a duration relatively longer than short duration radar pulses, FFT unit 110 may output the second FFT capture at a higher resolution while the signal is still being received by antenna 116. In one embodiment, the second FFT capture may be performed at approximately four times the resolution of the first FFT capture, although other resolutions may be employed as desired. Notably, when performing the second FFT capture, the automatic gain control (AGC) of WLAN transceiver 104 may be more properly converged, resulting in a more appropriately amplified signal and providing an FFT capture that may be more accurate than the first FFT capture, performed at the coarser resolution. Accordingly, a secondary threshold may be applied when validating candidate radar signals identified during the initial analysis. In one aspect, the secondary threshold may be more aggressive than the initial threshold. The secondary threshold, and any other thresholds employed using these techniques, may be determined in any suitable manner, including device testing, simulation, measurement, calibration and the like. By employing the secondary threshold, greater differentiation between actual narrowband radar signals and wideband WLAN signals may be obtained.

Figure 4:
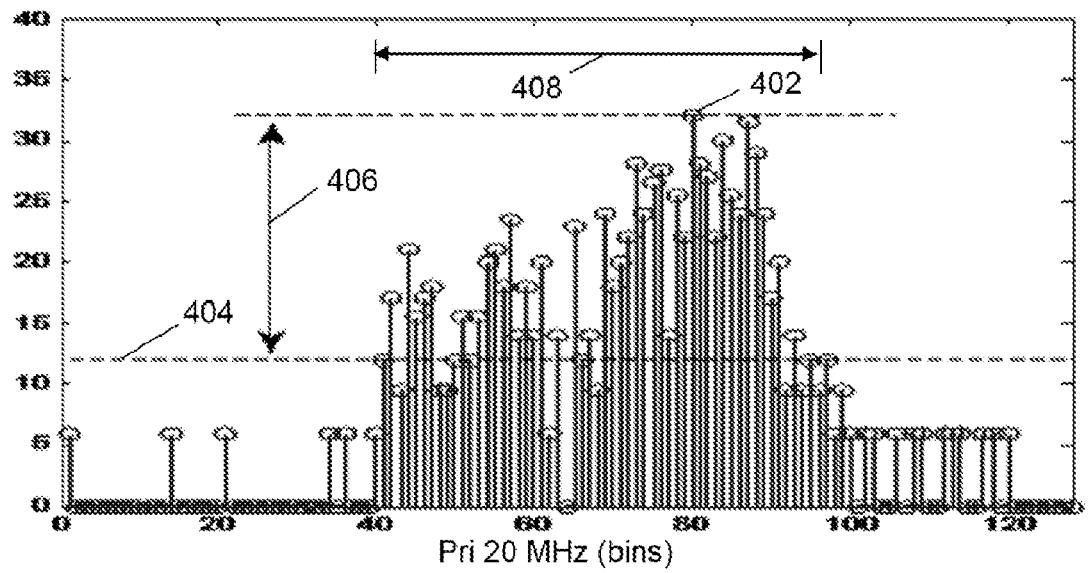
FIG. 4 depicts a higher resolution FFT capture of a wideband signal, according to one embodiment.

For example, a signal that results in the first FFT capture shown in FIG. 3 may have a corresponding second FFT capture having four times the resolution, as depicted in FIG. 4. Here, peak signal power bin 402 provides a reference for determining secondary threshold 404, as established by difference 406 relative to the peak. As shown, there is a cluster 408 of bins exceeding secondary threshold 404. The number of bins in cluster 408 may be greater than a threshold number of bins, which may be based at least in part on the resolution of the second FFT capture, such as a bin number threshold of approximately 20. Any suitable bin threshold number may be tailored to the resolution of the second FFT capture and may be adjusted to obtain a desired level of performance. Accordingly, the signal represented in FIG. 4 may be determined to correspond to a WLAN transmission or other non-radar source, such that the candidate identification using the first FFT capture may be characterized as a false detection and operation of wireless communications device 102 on the current channel may be allowed.

Figure 5:
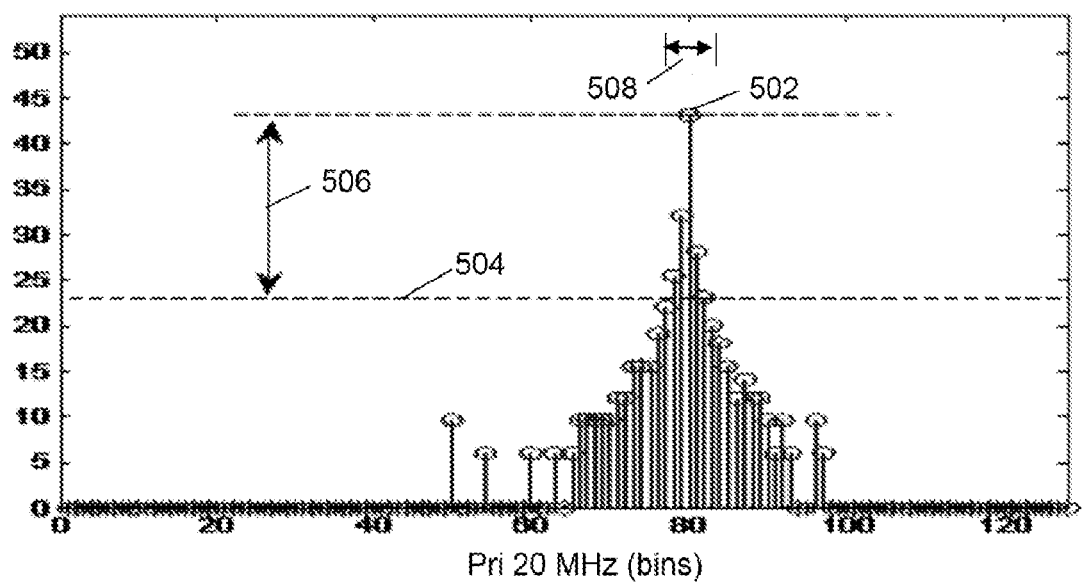
FIG. 5 depicts a higher resolution FFT capture of a narrowband radar signal, according to one embodiment.

In contrast, FIG. 5 illustrates a second FFT capture of a signal that would also result in a first FFT capture corresponding to the one shown in FIG. 3. Peak signal bin 502 may be used to determine secondary threshold 504 relative to difference 506. In this example, the number of bins in cluster 508 may be below the threshold number of bins, such that the signal represented in FIG. 5 may be determined to be a narrowband, radar signal, validating the initial identification as a candidate radar signal.

In some situations, the power from a WLAN transmission may be present for a sufficient duration to allow multiple FFT captures to be performed at the second resolution, or at other higher resolutions than the first resolution. Accordingly, the results of any subsequent FFT captures may be determined to be more valid than earlier FFT captures.

In another embodiment, the secondary analysis used to validate an initial candidate radar signal determination may include performing a signal analysis over a frequency range greater than the bandwidth of the current channel, including at least some out of band frequencies. As desired, FFT unit 110 may provide an increased bandwidth FFT capture during the initial signal analysis or subsequently, following identification of candidate radar signals. In one aspect, the increased bandwidth range may be based at least in part on limits of WLAN transceiver 104 components. For example, the sampling rate of the analog to digital converter (ADC) used to process the output of FFT unit 110 may allow twice as many frequency bins as those corresponding to in band bins to be computed. Other sample rates or other ranges of increased bandwidth may be employed as desired.

Figure 6:
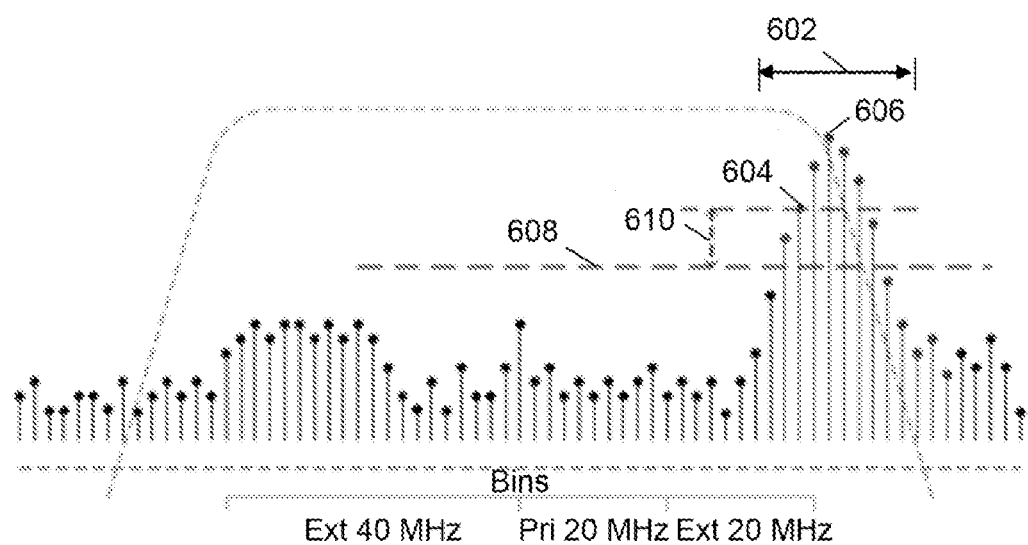
FIG. 6 depicts an FFT capture of a wideband signal on an adjacent band, according to one embodiment.

As will be appreciated, WLAN communication may occur on multiple wireless channels, some of which are adjacent each other. Accordingly, operation of another WLAN system on an adjacent channel may result in interference that may share characteristics of a narrowband radar signal. For example, FIG. 6 depicts an FFT capture that may be obtained from a signal corresponding to WLAN operation on an adjacent signal. As shown, a wideband signal 602 may overlap a portion of the operating channel. An initial analysis over in band frequencies may identify peak signal bin 604 within the in band frequency range, even though the actual peak of wideband signal 602 may occur at bin 606. If peak signal bin 604 is used to establish initial threshold 608 from relative difference 610, wideband signal 602 may be identified as a candidate radar signal. In one aspect, the secondary analysis may comprise identifying peak signal bin 604 as being near a boundary of the operating channel, such as exactly at the band edge or within a threshold number of bins. Under this condition, radar unit 114 may determine that peak signal bin 604 is caused by the spectral skirt of an adjacent channel blocker and may invalidate the candidate radar signal identification as a false detection.

Figure 7:
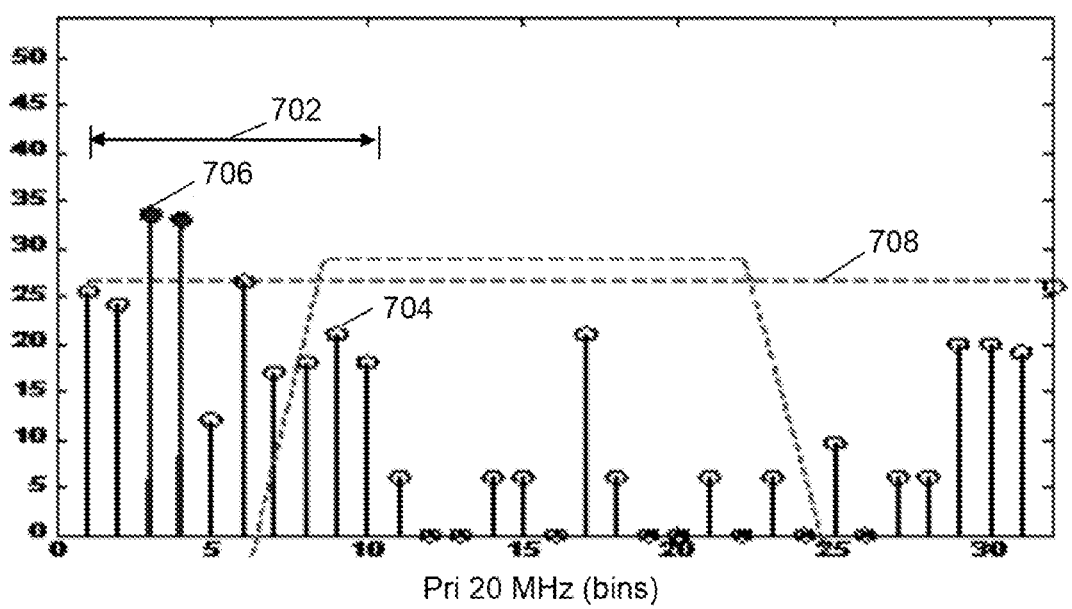
FIG. 7 depicts another FFT capture of a wideband signal on an adjacent band, according to one embodiment.

In other situations, WLAN operation on an adjacent channel may not result in the peak signal bin occurring exactly at the band edge. By configuring FFT unit 110 to provide an FFT capture over an increased bandwidth, radar unit 114 may correctly identify such false detections. As shown in the FFT capture represented by FIG. 7, wideband signal 702 may exist on an adjacent channel, but near the boundary of the operating channel. However, the greatest signal strength recorded within the in band frequency range, peak signal bin 704, is not exactly at the band edge, but is slightly in band. By performing the secondary analysis over an increased bandwidth, true peak bin 706 may be identified. In one aspect, the signal provided to FFT unit 110 may be fed through an analog filter configured to attenuate out of band signals to improve sensitivity. As such, radar unit 114 may be configured to interpret any peak out of band signal as actually corresponding to an even stronger signal and may assume that any peaks detected in band is a result from this out of band interference. In these implementations, the presence of an out of band peak may be used by radar unit 114 to identify any candidate radar signals as false detections. In another aspect, a secondary threshold 708 may be established relative to true peak bin 706, such that number of in band bins exceeding the secondary threshold may be used to characterize the signal as narrowband or not.

In a further aspect, radar unit 114 may be configured to recognize the possibility that an out of band peak may migrate in band over time. This characteristic may be associated with a chirping radar signal. Accordingly, radar unit 114 may track the frequency bin associated with a peak detection, such that if a peak appears in band during the subsequent FFT captures, radar unit 114 may validate or otherwise identify such a signal as corresponding to a chirping radar signal.

In a further aspect, radar unit 114 may be configured to recognize the possibility that an in band peak may migrate out of band over time. This characteristic may be associated with a chirping radar signal. Accordingly, radar unit 114 may track the frequency bin associated with a peak detection, such that if peak originally occurring in band appears out of band during the subsequent FFT captures, radar unit 114 may validate or otherwise identify such a signal as corresponding to a chirping radar signal.

In another aspect, the information obtained from obtaining the FFT capture over the increased bandwidth may also be used to determine the presence of adjacent interference to avoid when performing future channel switches.

Another embodiment of this disclosure is directed to a secondary analysis that determines whether a radio frequency (RF) saturation event has occurred. A strong WLAN transmission operating in a far channel can jam the analog front end of WLAN transceiver 104 and may be termed an "RF saturation event." Performing an initial FFT analysis to determine whether a narrowband radar signal is present in-band under these conditions may result in a false detection. Relative power checks may determine the ratio of the in band power relative to the total power seen by the baseband and compared to a threshold to determine whether the signal is in band or not. However, setting this threshold too high may eliminate some actual short radar pulses that are in band. Accordingly, this threshold is not sufficient to accurately recognize false identifications when a far alternate signal is aliased in band.

Figure 8:
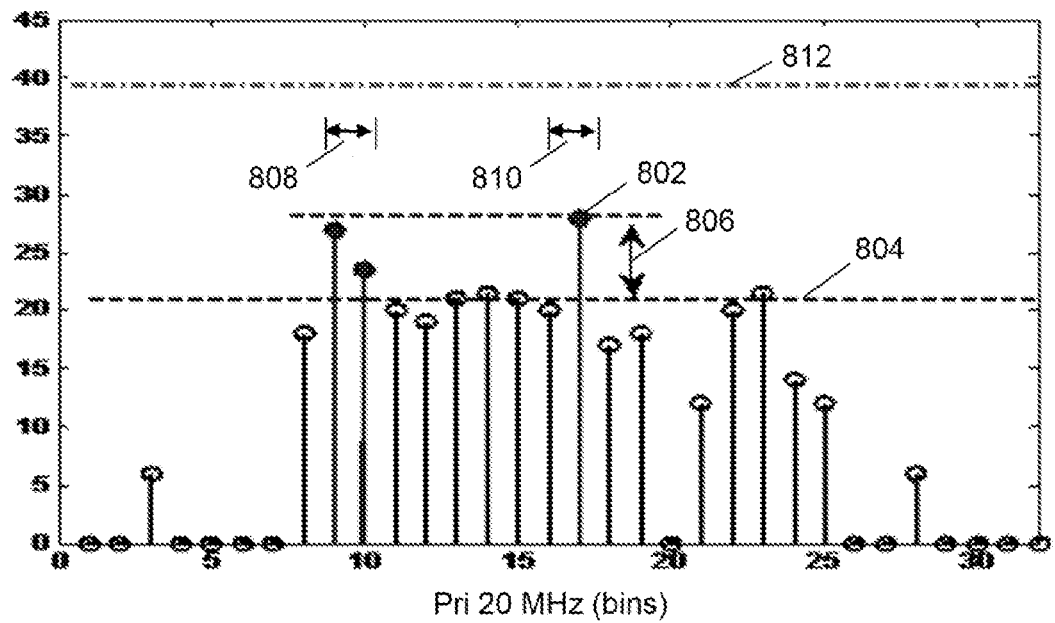
FIG. 8 depicts an FFT capture of an incoming signal including a far blocker following an RF saturation event, according to one embodiment.

As shown in the FFT capture represented in FIG. 8, operation of another WLAN system on a far channel may result in an aliased signal, including peak signal bin 802, appearing in band. By setting initial threshold 804 relative to difference 806 from peak signal bin 802, one or more groups of bins, such as cluster 808 and cluster 810, may be identified as candidate radar signals. Accordingly, radar unit 114 may be configured to employ saturation threshold 812 for one or more FFT captures following an RF saturation event. When no bins exceed saturation threshold 812, radar unit 114 may determine that any candidate radar signal identified during an initial signal analysis are to be classified as false detections.

Figure 9:
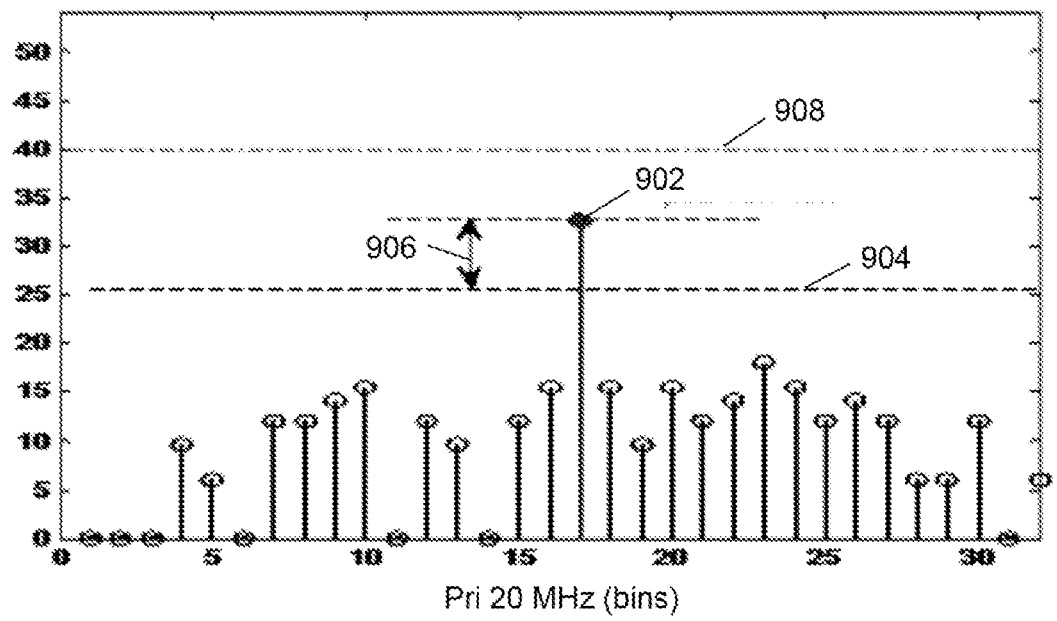
FIG. 9 depicts an FFT capture of an incoming signal including a residual DC component following an RF saturation event, according to one embodiment.

Following an RF saturation event, a residual direct current (DC) component may also be present in band. The FFT capture shown in FIG. 9 includes peak signal bin 902, corresponding to a residual DC component. Initial threshold 904, established relative to difference 906 from peak signal bin 902 may result in identification of this signal as a candidate radar signal. Radar unit 114 may employ saturation threshold 908 to determine that peak signal bin 902 does not exceed this threshold and correspondingly determine that the candidate radar signal is a false detection.

Figure 10:
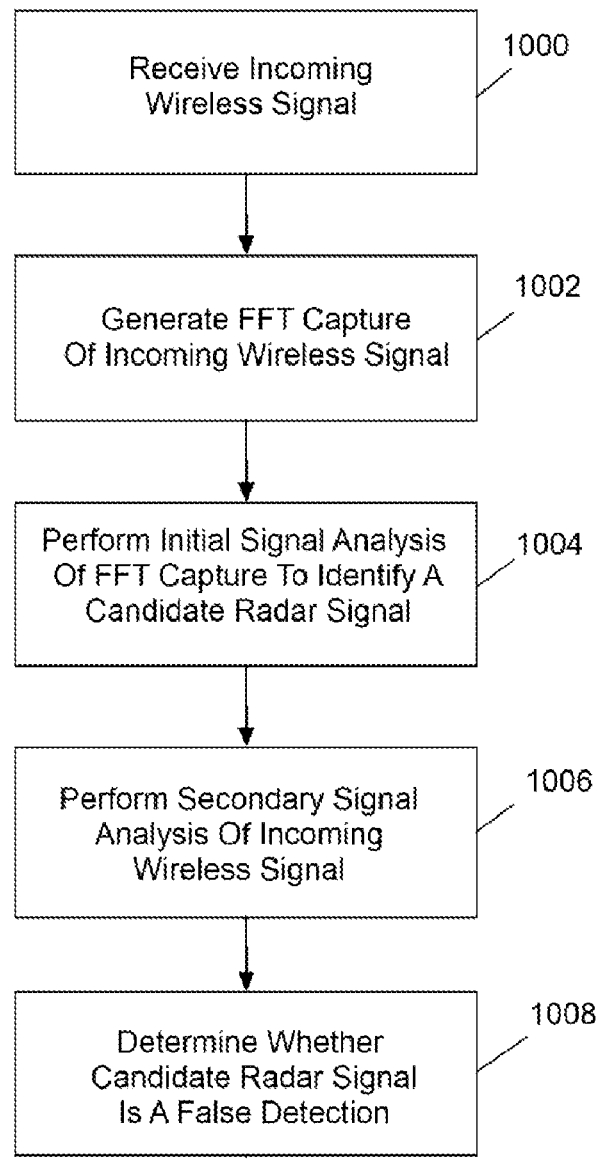
FIG. 10 depicts a flowchart representing an exemplary routine for identifying false detections of radar signals, according to one embodiment.

To help illustrate aspects of the disclosure, a representative routine is depicted in the flowchart of FIG. 10. Beginning with 1000, WLAN transceiver 104 may receive an incoming wireless signal. FFT unit 110 may then generate an FFT capture in 1002. As described above, the FFT capture may include determining signal magnitude for a plurality of frequency bins of the incoming wireless signal. In 1004, radar unit 114 may perform an initial signal analysis on the first FFT capture to identify a candidate radar signal. In one aspect, radar unit 114 may identify a candidate radar signal if at least one of the frequency bins exceeds an initial threshold. Next, in 1006, radar unit 114 may perform one or more the secondary analyses described above on the incoming wireless signal. When indicated by the secondary analysis, radar unit 114 may determine the candidate radar signal is a false detection in 1008.

Yet another embodiment of this disclosure is directed to a secondary analysis that involves post processing results from a plurality of FFT captures output by FFT unit 110. A characteristic of some radar signals is that a recurring signal may appear at substantially the same frequency. In contrast, other interference that may share some characteristics of a radar signal may not recur at the same frequency. Accordingly, a candidate radar signal determined from a first FFT capture may be categorized by frequency such that candidate radar signals determined from subsequent FFT captures may be matched based at least in part on frequency. Radar unit 114 may maintain a plurality of detection bins having a frequency range. When analyzing a candidate radar signal, radar unit 114 may determine if the frequency of the candidate radar signal matches the frequency of other signals that have been assigned to the corresponding detection bin. In one aspect, radar unit 114 may log candidate radar signals to corresponding detection bins such that subsequent candidate radar signal belonging to a given detection bin may be excluded if the frequency does not match. In another aspect, radar unit 114 may maintain a set of in-flight matches prior to assigning the candidate radar pulse to a detection bin. One or more subsequent candidate radar signals may be added upon matching the frequency.

These techniques may be applied advantageously when detecting frequency hopping radar signals. A characteristic of such radar signals is that a first burst of pulses may arrive at one fixed frequency, then a second burst at another frequency, a third burst at another frequency, and so on. Radar unit 114 may match frequencies for the initial burst, such that all candidate radar signals should have substantially the same frequency, and may match frequencies for each subsequent burst according to the corresponding frequency. Further, these techniques may also be applied to detecting chirping radar signals. As described, such signals may be characterized by frequency changes that occur linearly over a frequency range, such as may be defined by the regulatory bodies corresponding to the area in which the radar is operating and may be required to be detected for DFS compliance. A chirping radar signal may be matched at the starting and ending frequencies to confirm that the candidate radar signal has a frequency change over time that matches the chirp specification. Further, each FFT capture may be analyzed to verify that each FFT shows this frequency change over time is linear. When these conditions are met, radar unit 114 may validate the candidate radar signal as corresponding to a chirping radar signal.

Described herein are presently preferred embodiments. However, one skilled in the art that pertains to the present embodiments will understand that the principles of this disclosure can be extended easily with appropriate modifications to other applications.

What is claimed is:

1. A wireless communications device configured to detect radar signals, comprising:
   a receiver having a Fast Fourier Transform (FFT) unit for receiving an incoming signal, wherein the FFT unit generates a first FFT capture including a signal magnitude for a plurality of frequency bins; and
   a radar unit configured to:
      perform an initial signal analysis on the first FFT capture;
      identify a candidate radar signal based at least in part on whether the signal magnitude of at least one of the frequency bins exceeds an initial threshold;
      perform a secondary signal analysis on the incoming signal; and
      determine the candidate radar signal is a false detection based at least in part on the secondary signal analysis.

2. The wireless communications device of claim 1, wherein the FFT unit is further configured to generate a second FFT capture of the incoming signal including a signal magnitude for a plurality of frequency bins, wherein the first FFT capture is performed at a first resolution, the second FFT capture is performed at a second resolution and the second resolution is higher than the first resolution and wherein the radar unit performs the secondary signal analysis using the second FFT capture.

3. The wireless communications device of claim 2, wherein the radar unit determines the candidate radar signal is a false detection based at least in part on the signal magnitude of at least one of the frequency bins of the second FFT capture exceeding a secondary threshold.

4. The wireless communications device of claim 2, wherein the FFT unit is further configured to generate at least one subsequent FFT capture of the incoming signal and wherein the radar unit performs the secondary signal analysis using the subsequent FFT capture to supersede the second FFT capture.

5. The wireless communications device of claim 1, wherein the radar unit performs the secondary signal analysis by determining a location of a frequency bin having a maximal signal magnitude in relation to a wireless channel at which the receiver is operating and wherein the radar unit determines the candidate radar signal is a false detection based at least in part on the frequency bin having the maximal signal magnitude being located at a band edge of the wireless channel.

6. The wireless communications device of claim 1, wherein the FFT unit is configured to generate the first FFT capture over an increased bandwidth greater than a current channel bandwidth and wherein the radar unit performs the secondary signal analysis by determining a location of a frequency bin having a maximal signal magnitude in relation to a boundary of a wireless channel at which the receiver is operating.

7. The wireless communications device of claim 6, wherein the radar unit determines the candidate radar signal is a false detection based at least in part on the frequency bin having the maximal signal magnitude being located outside the wireless channel.

8. The wireless communications device of claim 7, wherein the radar unit further determines the candidate radar signal is a false detection based at least in part on a frequency bin within the wireless channel having a maximal signal magnitude not exceeding a secondary threshold.

9. The wireless communications device of claim 1, wherein the radar unit is further configured to detect a radio frequency (RF) saturation event, wherein the radar unit performs the secondary signal analysis by determining a maximal signal magnitude of a frequency bin and wherein the radar unit determines the candidate radar signal is a false detection based at least in part on the maximal signal magnitude of the frequency bin does not exceed a saturation threshold, wherein the saturation threshold is greater than the initial threshold.

10. A method for detecting a radar signal, comprising:
receiving an incoming wireless signal at a receiver;
generating a first Fast Fourier Transform (FFT) capture including a signal magnitude for a plurality of frequency bins of the incoming wireless signal;
performing an initial signal analysis on the first FFT capture;
identifying a candidate radar signal based at least in part on whether the signal magnitude of at least one of the frequency bins exceeds an initial threshold;
performing a secondary signal analysis on the incoming wireless signal; and
determining the candidate radar signal is a false detection based at least in part on the secondary signal analysis.

11. The method of claim 10, further comprising generating a second FFT capture of the incoming wireless signal including a signal magnitude for a plurality of frequency bins, wherein the first FFT capture is performed at a first resolution, the second FFT capture is performed at a second resolution and the second resolution is higher than the first resolution and wherein performing secondary signal analysis comprises using the second FFT capture.

12. The method of claim 11, wherein determining the candidate radar signal is a false detection is based at least in part on the signal magnitude of at least one of the frequency bins of the second FFT capture exceeding a secondary threshold.

13. The method of claim 11, further comprising generating at least one subsequent FFT capture of the incoming wireless signal and wherein performing secondary signal analysis comprises superseding the second FFT capture with the subsequent FFT capture.

14. The method of claim 10, wherein performing secondary signal analysis comprises determining a location of a frequency bin having a maximal signal magnitude in relation to a wireless channel at which the receiver is operating and wherein determining the candidate radar signal is a false detection is based at least in part on the frequency bin having the maximal signal magnitude being located at a band edge of the wireless channel.

15. The method of claim 10, wherein generating the first FFT capture comprises generating an FFT capture over an increased bandwidth greater than a current channel bandwidth and wherein performing secondary signal analysis comprises determining a location of a frequency bin having a maximal signal magnitude in relation to a boundary of a wireless channel at which the receiver is operating.

16. The method of claim 15, wherein determining the candidate radar signal is a false detection is based at least in part on the frequency bin having the maximal signal magnitude being located outside the wireless channel.

17. The method of claim 16, wherein determining the candidate radar signal is a false detection is based at least in part on a frequency bin within the wireless channel having a maximal signal magnitude not exceeding a secondary threshold.

18. The method of claim 10, further comprising detecting a radio frequency (RF) saturation event, wherein performing secondary signal analysis comprises determining a maximal signal magnitude of a frequency bin and wherein determining the candidate radar signal is a false detection is based at least in part on the maximal signal magnitude of the frequency bin not exceeding a saturation threshold, wherein the saturation threshold is greater than the initial threshold.

19. A non-transitory processor-readable storage medium for detecting radar signals with a wireless communications device, the processor-readable storage medium having instructions thereon, when executed by a processor to cause the wireless communications device to:
receive an incoming wireless signal at a receiver;
generate a first Fast Fourier Transform (FFT) capture including a signal magnitude for a plurality of frequency bins of the incoming wireless signal;
perform an initial signal analysis on the first FFT capture;
identify a candidate radar signal based at least in part on whether the signal magnitude of at least one of the frequency bins exceeds an initial threshold;
perform a secondary signal analysis on the incoming wireless signal; and
determine the candidate radar signal is a false detection based at least in part on the secondary signal analysis.

20. The storage medium of claim 19, having further instructions thereon to cause the wireless communications device to generate a second FFT capture of the incoming wireless signal including a signal magnitude for a plurality of frequency bins, wherein the first FFT capture is performed at a first resolution, the second FFT capture is performed at a second resolution and the second resolution is higher than the first resolution and wherein the instructions to cause the wireless communications device to perform secondary signal analysis comprise instructions to use the second FFT capture.

21. The storage medium of claim 20, wherein the instructions to cause the wireless communications device to determine the candidate radar signal is a false detection include instructions to determine the signal magnitude of at least one of the frequency bins of the second FFT capture exceeds a secondary threshold.

22. The storage medium of claim 20, having further instructions thereon to cause the wireless communications device to generate at least one subsequent FFT capture of the incoming wireless signal and wherein the instructions to cause the wireless communications device to perform secondary signal analysis comprise instructions to supersede the second FFT capture with the subsequent FFT capture.

23. The storage medium of claim 19, wherein the instructions to cause the wireless communications device to perform secondary signal analysis comprise instructions to determine a location of a frequency bin having a maximal signal magnitude in relation to a wireless channel at which the receiver is operating and wherein the instructions to cause the wireless communications device to determine the candidate radar signal is a false detection include instructions to determine the frequency bin having the maximal signal magnitude is located at a band edge of the wireless channel.

24. The storage medium of claim 19, wherein the instructions to cause the wireless communications device to generate the first FFT capture comprise instructions to generate an FFT capture over an increased bandwidth greater than a current channel bandwidth and wherein the instructions to cause the wireless communications device to perform secondary signal analysis comprise instructions to determine a location of a frequency bin having a maximal signal magnitude in relation to a boundary of a wireless channel at which the receiver is operating.

25. The storage medium of claim 24, wherein the instructions to cause the wireless communications device to determine the candidate radar signal is a false detection include instructions to determine the frequency bin having the maximal signal magnitude is located outside the wireless channel.

26. The storage medium of claim 25, wherein the instructions to cause the wireless communications device to determine the candidate radar signal is a false detection include instructions to determine a frequency bin within the wireless channel having a maximal signal magnitude does not exceed a secondary threshold.

27. The storage medium of claim 19, having further instructions thereon to cause the wireless communications device to detect a radio frequency (RF) saturation event, wherein the instructions to cause the wireless communications device to perform secondary signal analysis comprise instructions to determine a maximal signal magnitude of a frequency bin and wherein the instructions to cause the wireless communications device to determine the candidate radar signal is a false detection include instructions to determine the maximal signal magnitude of the frequency bin does not exceed a saturation threshold, wherein the saturation threshold is greater than the initial threshold.

* * * * *